(12) United States Patent
Sakamoto et al.

(10) Patent No.: US 10,840,538 B2
(45) Date of Patent: Nov. 17, 2020

(54) LITHIUM METAL SECONDARY BATTERY USING LITHIUM METAL AS NEGATIVE ELECTRODE ACTIVE MATERIAL

(71) Applicant: Panasonic Intellectual Property Management Co., Ltd., Osaka (JP)

(72) Inventors: Junichi Sakamoto, Osaka (JP); Akira Kano, Osaka (JP); Tooru Matsui, Osaka (JP); Kazuko Asano, Osaka (JP); Kiyoshi Kanamura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 260 days.

(21) Appl. No.: 15/980,216

(22) Filed: May 15, 2018

(65) Prior Publication Data
US 2018/0342754 A1    Nov. 29, 2018

(30) Foreign Application Priority Data

May 29, 2017 (JP) .................. 2017-105706
Jun. 15, 2017 (JP) .................. 2017-118069

(51) Int. Cl.
| | |
|---|---|
| H01M 10/0562 | (2010.01) |
| H01M 10/0565 | (2010.01) |
| H01M 2/16 | (2006.01) |
| H01M 4/134 | (2010.01) |
| H01M 4/38 | (2006.01) |
| H01M 10/052 | (2010.01) |
| H01M 10/0568 | (2010.01) |
| H01M 4/76 | (2006.01) |
| H01M 4/80 | (2006.01) |
| H01M 4/02 | (2006.01) |
| H01M 4/82 | (2006.01) |
| H01M 10/0566 | (2010.01) |
| H01M 4/1395 | (2010.01) |
| H01M 4/72 | (2006.01) |

(52) U.S. Cl.
CPC ....... *H01M 10/052* (2013.01); *H01M 2/1653* (2013.01); *H01M 4/134* (2013.01); *H01M 4/382* (2013.01); *H01M 4/762* (2013.01); *H01M 4/80* (2013.01); *H01M 10/0562* (2013.01); *H01M 10/0565* (2013.01); *H01M 10/0568* (2013.01); *H01M 4/1395* (2013.01); *H01M 4/72* (2013.01); *H01M 4/82* (2013.01); *H01M 10/0566* (2013.01); *H01M 2004/021* (2013.01); *H01M 2004/027* (2013.01); *H01M 2300/0028* (2013.01); *H01M 2300/0068* (2013.01); *H01M 2300/0071* (2013.01); *H01M 2300/0082* (2013.01)

(58) Field of Classification Search
CPC ...... H01M 10/052; H01M 4/80; H01M 4/762; H01M 4/134; H01M 4/382; H01M 2/1653; H01M 10/0568; H01M 10/0565; H01M 10/0562; H01M 2300/0071; H01M 4/72; H01M 4/1395; H01M 10/0566; H01M 4/82; H01M 2300/0028; H01M 2300/0082; H01M 2300/0068; H01M 2004/027; H01M 2004/021; H01M 2300/0088; H01M 10/058; H01M 10/056; H01M 10/0525

See application file for complete search history.

(56) References Cited

U.S. PATENT DOCUMENTS

| | | | | |
|---|---|---|---|---|
| 5,162,178 | A | * | 11/1992 | Ohsawa ............... H01M 4/045 429/213 |
| 2014/0234732 | A1 | * | 8/2014 | Park ..................... H01M 4/134 429/405 |
| 2015/0017549 | A1 | * | 1/2015 | Nishimura ........ H01M 10/0562 429/322 |
| 2015/0050537 | A1 | | 2/2015 | Christensen et al. |
| 2016/0020461 | A1 | * | 1/2016 | Yang ................... H01M 10/049 429/231.95 |
| 2016/0211498 | A1 | * | 7/2016 | Kim ..................... H01M 2/1686 |
| 2018/0114977 | A1 | * | 4/2018 | Sakamoto ............ H01M 4/525 |
| 2020/0066459 | A1 | * | 2/2020 | Yokoshima ........ H01M 10/0585 |

FOREIGN PATENT DOCUMENTS

| | | |
|---|---|---|
| EP | 2975673 A1 | 1/2016 |
| JP | 2001-068162 | 3/2001 |
| JP | 2004-014151 | 1/2004 |
| JP | 2011-146157 | 7/2011 |
| JP | 2015-213007 | 11/2015 |

(Continued)

OTHER PUBLICATIONS

Communication pursuant to Article 94(3) EPC dated May 31, 2019 for the related European Patent Application No. 18172868.4.

(Continued)

*Primary Examiner* — Muhammad S Siddiquee
(74) *Attorney, Agent, or Firm* — McDermott Will & Emery LLP

(57) ABSTRACT

A lithium metal secondary battery includes a positive electrode, a negative electrode, a solid electrolyte, and a soft electrolyte. The negative electrode includes a negative electrode current collector having at least one hole, in which lithium metal is deposited in a charged state. The solid electrolyte is disposed on the surface, which face negative electrode current collector, of the positive electrode. The soft electrolyte fills the space between the negative electrode current collector and solid electrolyte and entering into the at least one hole. The solid and soft electrolytes have lithium ion conductivity.

16 Claims, 8 Drawing Sheets

(56) References Cited

FOREIGN PATENT DOCUMENTS

| JP | 2016-018606 | 2/2016 |
|----|-------------|--------|
| JP | 2016-038985 | 3/2016 |
| JP | 2017-054792 | 3/2017 |
| WO | 2013/140942 | 9/2013 |

OTHER PUBLICATIONS

The Extended European Search Report dated Jul. 12, 2018 for the related European Patent Application No. 18172868.4.
Masashi Kotobuki et al: "Fabrication of all-solid-state lithium battery with lithium metal anode using Al2O3-added Li7La3Zr2O12 solid electrolyte", Journal of Power Sources, Elsevier SA, CH, vol. 196, No. 18, Apr. 21, 2011 (Apr. 21, 2011), pp. 7750-7754, XP028378310.

\* cited by examiner

100A

100A

LITHIUM METAL SECONDARY BATTERY USING LITHIUM METAL AS NEGATIVE ELECTRODE ACTIVE MATERIAL

BACKGROUND

1. Technical Field

The present disclosure relates to a lithium metal secondary battery that uses lithium metal as a negative electrode active material and includes a solid electrolyte.

2. Description of the Related Art

With its electrical capacity of 2062 mAh/cm$^3$, lithium metal is expected to enable a high-energy-density secondary battery when used as a negative electrode active material. However, lithium metal is deposited on the negative electrode current collector during charging and is dissolved during discharging, and this causes the negative electrode to suffer extreme changes in volume during repeated charge and discharge cycles. Moreover, the deposition of lithium metal on the negative electrode current collector is often uneven and can entail the formation of lithium dendrites, having a large specific surface area, caused by localized distribution of current. The formation of lithium dendrites affects the charge and discharge efficiency and safety of the battery.

International Publication No. 2013/140942 discloses an all-solid-state lithium secondary battery that has a positive electrode and a negative electrode each incorporating a porous current collector having a three-dimensional network of pores filled at least with an active material. The three-dimensional network structure of the current collectors increases the areas of contact between the current collectors and active materials, thereby reducing internal resistance.

Japanese Unexamined Patent Application Publication No. 2015-213007 proposes a method for producing an electrochemical device that includes a positive electrode, a negative electrode, and an electrolyte layer that is a layer of a solid electrolyte. In this method, a fibrous polymer electrolyte is disposed between the positive electrode and the electrolyte layer and/or between the negative electrode and the electrolyte layer. Stacking the electrode, solid electrolyte, and a fibrous polymer electrolyte therebetween improves the adhesion between the electrode and electrolyte layer, thereby enhancing electrical properties.

SUMMARY

In one general aspect, the techniques disclosed here feature a lithium metal secondary battery. The lithium metal secondary battery includes a positive electrode; a negative electrode including a negative electrode current collector having at least one hole, in which lithium metal is deposited in a charged state; a solid electrolyte disposed on a surface, which faces the negative electrode current collector, of the positive electrode, the solid electrolyte having lithium ion conductivity; and a soft electrolyte filling a space between the negative electrode current collector and the solid electrolyte and entering into the at least one hole, the soft electrolyte having lithium ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
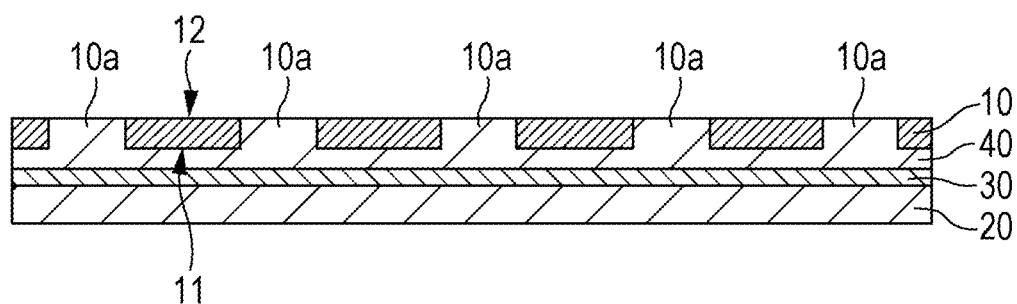
FIG. 1A is a schematic diagram illustrating a first example of a cross-sectional structure of a lithium metal secondary battery.

Underlying Knowledge Forming Basis of the Present Disclosure

The inventors believe that even in secondary batteries that use lithium metal as a negative electrode active material and employ a solid electrolyte, increasing the area of contact between the negative electrode current collector and lithium metal reduces internal resistance effectively. The contact between the negative electrode current collector and solid electrolyte in the discharged state, however, is point contact in principle, and the deposition of lithium metal during charging proceeds at the points of contact. This means that even with an increased area of contact between the current collector and lithium metal, it remains likely that current accumulates locally, and the charge and discharge efficiency is often low.

Improving the adhesion between the electrodes and the electrolyte layer provides more uniform deposition of lithium metal onto the negative electrode current collector. Even this, however, leaves the changes in negative electrode volume during charge and discharge cycles great, often resulting in low charge and discharge efficiency.

One non-limiting and exemplary embodiment provides a lithium metal secondary battery with superior charge and discharge efficiency.

Embodiment

A lithium metal secondary battery according to an embodiment of the present disclosure has a positive electrode, a negative electrode, a first electrolyte, and a second electrolyte different from the first electrolyte. The negative electrode has a negative electrode current collector. The negative electrode current collector has a first surface facing the positive electrode and a second surface opposite the first surface and has at least one hole in the first surface. Charging makes lithium metal deposited in the hole, and discharging makes lithium metal dissolved. The first electrolyte is a solid electrolyte that has lithium ion conductivity. The second electrolyte has lithium ion conductivity and is in contact with the first surface. At least part of the second electrolyte is inside at least part of the hole. That is, whereas the first electrolyte is solid, the second electrolyte is fluid or flexible enough that it can enter into at least part of the hole while remaining in contact with the first surface. The positive electrode, first electrolyte, second electrolyte, and negative electrode are stacked in this order.

During charging, lithium ions enter into at least part of the hole from the first surface side and are deposited in the hole as lithium metal. The hole in the negative electrode current collector inhibits lithium metal from being deposited outside the hole, ensuring preferential deposition of lithium metal inside the hole, because much second electrolyte is in the hole and because the first electrolyte presses the first surface of the negative electrode current collector. Owing to this preferential deposition of lithium metal inside the hole, the deposition of lithium metal on the first surface of the negative electrode current collector and the associated change in the distance between the first surface and first electrolyte are limited. As a result, lithium metal can be dissolved and deposited without causing a great change in electrode or battery volume.

The percentage by volume of the second electrolyte contained in the at least one hole may be 5% or more and 90% or less of the total volume of the at least one hole in the negative electrode current collector. Entry of such an amount of the second electrolyte into the hole helps achieve a sufficiently high charge and discharge efficiency. Moreover, when the hole is not plugged with too much second electrolyte, there is left a clearance therein large enough that lithium can be deposited without pushing the second electrolyte out of the hole. The percentage by volume of the second electrolyte contained in the hole can be measured while the battery is in the discharged state. To be in the discharged state, the battery only needs to have an SOC (state of charge) of 10% or less, or a depth of discharge (DOD) of 90% or more. The nominal capacity of the battery can provide the basis for the SOC and DOD.

The percentage by volume of the second electrolyte contained in the hole can be determined by observing a cross-section of the negative electrode current collector or negative electrode using a scanning electron microscope (SEM) and calculating the percentage of the cross-sectional area of the second electrolyte to that of the hole. The cross-sectional area of a hole is that of the space surrounded by the plane at the same level as the first surface (in the case of a through hole, also by the plane at the same level as the second surface) and the wall of the negative electrode current collector demarcating the hole. The negative electrode current collector or negative electrode is cut to maximize the cross-sectional area of this space of each hole, and the obtained cross-section is observed using an SEM. If there are multiple discrete through or bottomed holes, the percentage can be determined by, for example, calculating the percentage of the cross-sectional area of the second electrolyte to that of the hole for five or more holes and averaging the results. If there are multiple interconnected pores (e.g., those in a spongiform negative electrode current collector), the percentage can be determined by, for example, observing a cross-section of the negative electrode current collector or negative electrode using an SEM over a length of 200 µm along the first surface and calculating the percentage of the cross-sectional area of the second electrolyte to that of all pores for the observed cross-section.

The reason for the improved charge and discharge efficiency is not clear in detail, but the outline is as follows.

If, in a secondary battery using lithium metal as a negative electrode active material, the first electrolyte is the only electrolyte and no second electrolyte is present, the interface between the first electrolyte and negative electrode current collector, at which lithium metal is deposited and dissolved, is a solid-solid interface. Since the contact between solid phases tends to be point contact, deposition starting around part of the negative electrode current collector (points of contact with the first electrolyte) during charging proceeds locally, only around that part. This inhibits lithium metal from plugging the hole, resulting in insufficient control of the expansion of the battery.

Moreover, the localized deposition of lithium metal leads to an extremely small area of contact between the first electrolyte and negative electrode current collector at the end stage of charging. In the subsequent discharging process, therefore, the pathways for the conduction of lithium ions and electrons are not sufficiently broad. Lithium metal is not dissolved well, affecting the charge and discharge efficiency.

By contrast, if there is a second electrolyte between the first electrolyte and negative electrode current collector, and if the second electrolyte reaches the inside of the hole the negative electrode current collector has, lithium ions can move into the hole by traveling through the second electrolyte. Lithium metal is deposited preferentially inside the hole, limiting the expansion of the battery. The second electrolyte, moreover, forms a good interface with the negative electrode current collector and first electrolyte.

Even if the deposition of lithium metal pushes the second electrolyte out of the hole, the flexible second electrolyte finds space to fit in somewhere between the first electrolyte and negative electrode. As a result, the expansion of the battery is limited, and sufficiently broad pathways for the conduction of lithium ions and electrons secured between the first electrolyte and negative electrode help improve the charge and discharge efficiency.

A lithium metal secondary battery according to an aspect of the present disclosure includes a positive electrode, a negative electrode, a solid electrolyte, and a soft electrolyte. The negative electrode includes a negative electrode current collector having at least one hole. The solid electrolyte is on the surface of the positive electrode facing the negative electrode current collector. The soft electrolyte fills the region between the negative electrode current collector and solid electrolyte and at least part of the inside of the at least one hole. The solid and soft electrolytes have lithium ion conductivity. In the charged state, lithium metal has been deposited inside the at least one hole, and in the discharged state, the lithium metal has been dissolved.

A lithium metal secondary battery according to another aspect of the present disclosure includes a positive electrode, a negative electrode, a solid electrolyte, and a soft electrolyte. The negative electrode includes a negative electrode current collector having at least one protrusion. The solid electrolyte is on the surface of the positive electrode facing the negative electrode current collector. The soft electrolyte fills the region between the negative electrode current collector and solid electrolyte and at least part of the region around the at least one protrusion. The solid and soft electrolytes have lithium ion conductivity. In the charged state, lithium metal has been deposited around the at least one protrusion, and in the discharged state, the lithium metal has been dissolved.

Figure 1B:
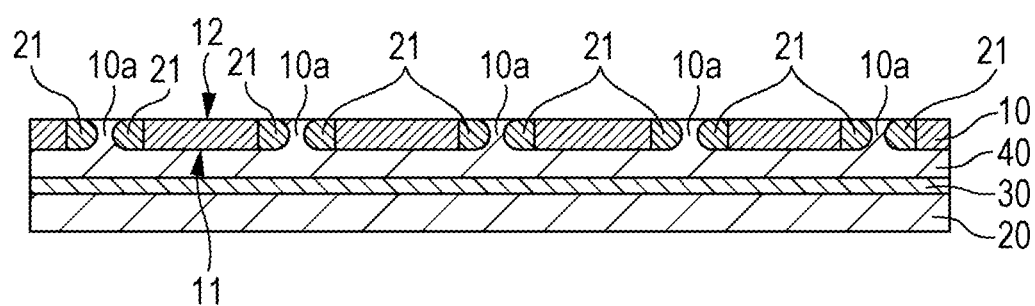
FIG. 1B is a schematic diagram illustrating the first example of a cross-sectional structure of a lithium metal secondary battery.

FIGS. 1A and 1B illustrate the cross-sectional structure of a lithium metal secondary battery 100A according to an embodiment of the present disclosure. FIG. 1A schematically illustrates the lithium metal secondary battery 100A in the discharged state right after assembly, and FIG. 1B the lithium metal secondary battery 100A in the charged state. These diagrams assume that the positive electrode is made of a material capable of storing and releasing lithium ions.

The lithium metal secondary battery 100A includes a negative electrode current collector 10 having multiple holes 10a for containing lithium metal, a second electrolyte 40 on the first surface 11 side of the negative electrode current collector 10, a first electrolyte 30 that is a solid electrolyte, and a positive electrode 20 stacked in this order. Part of the second electrolyte 40 is inside the holes 10a, and the rest lies substantially evenly between the negative electrode current collector 10 and first electrolyte 30. The holes 10a are through holes extending from the first surface 11 to the second surface 12. In this case, the cross-sectional area of a hole is that of the space surrounded by the plane at the same level as the first surface, the wall of the negative electrode current collector demarcating the hole, and the plane at the same level as the second surface. Creating the holes 10a as through holes makes it easier to put the second electrolyte 40 thereinto than in cases in which the holes 10a are bottomed or other similar holes, because in this case it is unlikely that air is retained in the holes 10a.

During charging, lithium ions released from the positive electrode 20 move preferentially into the holes 10a, in which the second electrolyte 40 is present abundantly and unlikely to bear the pressure of the first electrolyte 30 (solid electrolyte), and are deposited inside the holes 10a, forming lithium metal 21. The deposited lithium can push out the part of the second electrolyte 40 that is inside the holes 10a, but without causing a great expansion of the lithium metal secondary battery 100A in the direction of thickness because the expelled second electrolyte 20 spreads into space existing inside the lithium metal secondary battery 100A. The deposition of lithium metal 21 does not greatly expand the lithium metal secondary battery 100A in the direction of thickness either, because it proceeds selectively inside the holes 10a.

Figure 2A:
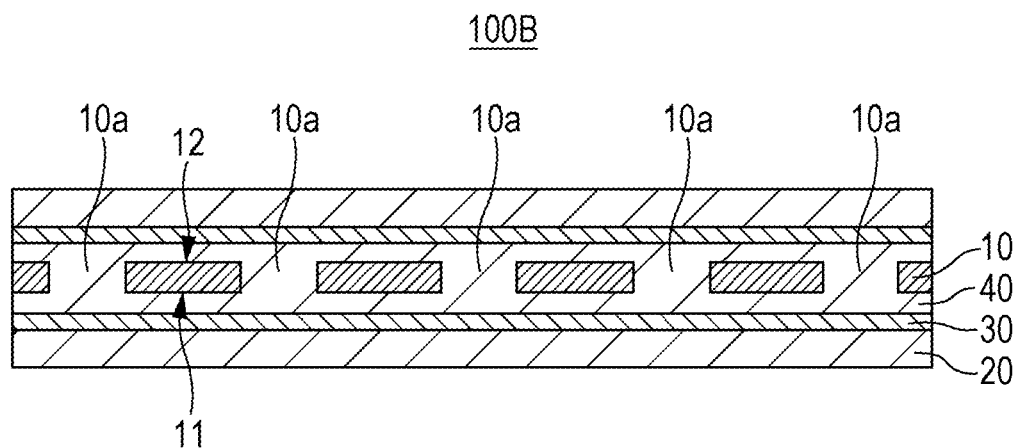
FIG. 2A is a schematic diagram illustrating a second example of a cross-sectional structure of a lithium metal secondary battery.
Figure 2B:
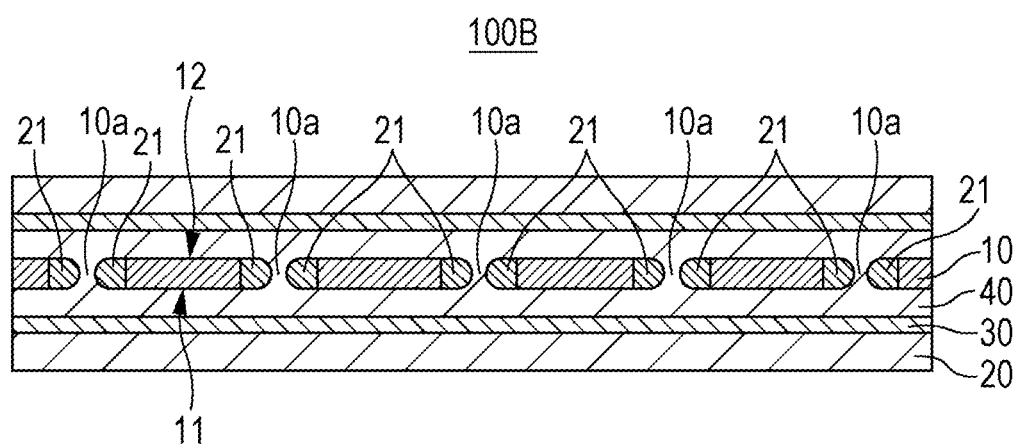
FIG. 2B is a schematic diagram illustrating the second example of a cross-sectional structure of a lithium metal secondary battery.

FIGS. 2A and 2B illustrate the cross-sectional structure of a lithium metal secondary battery 100B according to an embodiment of the present disclosure. FIG. 2A schematically illustrates the lithium metal secondary battery 100B in the discharged state right after assembly, and FIG. 2B the lithium metal secondary battery 100B in the charged state. These diagrams assume that the positive electrode is made of a material capable of storing and releasing lithium ions.

The lithium metal secondary battery 100B has another stack of the second electrolyte 40, the first electrolyte 30, and a positive electrode 20 in this order, on the second surface 12 side of the negative electrode current collector 10 besides the first surface 11 side. That is, the second electrolyte 40 is in contact not only with the first surface 11 but also with the second surface 12, and the first surface 11 and second surface 12 each face one of a pair of positive electrodes 20 with the first electrolyte 30 and second electrolyte 40 therebetween. The holes 10a are through holes extending from the first surface 11 to the second surface 12, allowing lithium ions to move across the negative electrode current collector 10 by passing through the holes 10a. Such a structure may be configured as a stacked or wound battery.

Negative Electrode Current Collector

The negative electrode current collector has a first surface and a second surface opposite the first surface and at least one hole in the first surface. There may be multiple holes. Each hole is, for example, a through or bottomed hole. As mentioned herein, a bottomed hole does not need to have a cylindrical inner wall. For example, a bottomed hole may be a dent in the surface of the negative electrode current collector. Creating at least one of multiple holes as through hole(s) extending through the first surface to the second surface makes it easier to put the second electrolyte into the holes because the through hole(s) helps prevent air from being retained in the holes. The negative electrode current collector may have a bottomed hole that opens only on the second surface side. If the negative electrode current collector has multiple holes, the holes may be interconnected pores.

The hole is difficult for the solid first electrolyte to enter into, but allows the second electrolyte to come inside easily. As a result of the second electrolyte intervening between the inner wall of the hole in the negative electrode current collector and the first electrolyte, a sufficiently broad ion conduction pathway is formed between the negative electrode current collector and first electrolyte.

A specific example of a negative electrode current collector is a two- or three-dimensionally porous metal sheet. Typical two-dimensionally porous metal sheets are those having multiple bottomed or through holes, but other forms can also be used. Typical three-dimensionally porous metal sheets are sheets of spongiform foam metal and sintered sheets of metal particles or fibers, but other forms can also be used. From the aspect of easy control the pattern of arrangement of multiple holes, it may be that the negative electrode current collector is a sheet having multiple bottomed or through holes.

Examples of methods for obtaining a sheet having multiple bottomed or through holes include, but are not limited to, mechanical processing, such as punching, of metal foil; chemical etching of metal foil, in which a chemical agent is used to etch the foil; physical etching, for example with plasma, of metal foil; and electrochemical etching of metal foil.

The negative electrode current collector can be made of any material as long as it can serve as a negative electrode current collector. Materials such as stainless steel, nickel, copper, and alloys containing at least one of these may be used.

The thickness of the negative electrode current collector may be, for example, 6 μm or more and 150 μm or less. A negative electrode current collector with a thickness of 150 μm or less occupies only a moderate volume fraction in the lithium metal secondary battery, thereby helping design a battery with a sufficiently high energy density. A negative electrode current collector with a thickness of 6 μm or more is not too thin and structurally strong enough to serve as a negative electrode current collector.

The average diameter of the hole on the first surface may be 5 μm or more. This helps the second electrolyte and lithium ions enter into the hole, thereby further facilitating the deposition of lithium metal in the hole. If the negative electrode current collector has hole(s) in the second surface as well, if one hole is a through hole extending from the first surface to the second surface, or if interconnected pore(s) extend from the first surface to the second surface, the same applies to the average diameter of the hole on the second surface. The average diameter of the hole on the first surface and that on the second surface may be 200 μm or less. This prevents the first electrolyte or positive electrode from bending and entering into the hole, thereby helping control the volume of the hole.

The average diameter of the hole can be determined by, for example, observing any five or more holes from the direction normal to the surface of the negative electrode current collector and averaging the equivalent circular diameter, i.e., the diameter of circles each having the same area as one of the selected holes.

The percentage of the total volume of multiple holes to the apparent volume of the negative electrode current collector may be 30% or more and 50% or less. This helps ensure that the volume of the holes, in which lithium metal is to be deposited, is sufficiently large, and that the negative electrode current collector is sufficiently strong. When a porous negative electrode current collector, such as a piece of foam metal, is used, this percentage corresponds to its porosity.

Lithium Metal

When the positive electrode contains lithium, the lithium metal does not need to be prepared separately. That is, simply assembling the negative electrode current collector, second electrolyte, first electrolyte, and positive electrode into a battery in the discharged state and then charging the battery results in lithium ions released from the positive electrode being deposited in the hole in the negative electrode current collector and emerging as lithium metal.

When the positive electrode contains no lithium, the deposition of lithium metal can be achieved simply by preparing lithium metal separately and assembling the negative electrode current collector, lithium metal, second electrolyte, first electrolyte, and positive electrode into a battery in the charged state. The lithium metal may be pure lithium metal, which contains 100% lithium, or a lithium alloy in which another element, such as Al or Si, is present in a percentage of 30% by mass or less or 10% by mass or less.

First Electrolyte

The first electrolyte is a solid electrolyte that has lithium ion conductivity. The solid electrolyte represents a material that exhibits a higher hardness than the second electrolyte and is less likely to plastically deform than the second electrolyte. The first electrolyte may be, for example, a molded or sintered piece of an inorganic solid electrolyte. The inorganic solid electrolyte can be, for example, an oxide or sulfide solid electrolyte. Interposing a hard first electrolyte between the positive electrode and negative electrode reduces internal short-circuiting drastically, because in such a structure it is usually not easy for lithium metal deposited on the first surface of the negative electrode current collector to penetrate through the first electrolyte.

Examples of oxide solid electrolytes that can be used include NASICON solid electrolytes, typified by $LiTi_2(PO_4)_3$ and its element-substituted forms (e.g., $Li_{1+x}Al_xTi_{2-x}(PO_4)_3$ and $Li_{1+x+y}Al_xTi_{2-x}P_{2-y}Si_yO_{12}$); perovskite solid electrolytes, typified by $(LaLi)TiO_3$ or $La_{1-3x}Li_{3x}TiO_3$; LISICON solid electrolytes, typified by $Li_4SiO_4$ and $LiGeO_4$ and their element-substituted forms (e.g., $Li_{4-2x}Zn_xGeO_4$ (an example is $Li_4ZnGe_4O_{16}$)); glass-ceramic solid electrolytes, typified by $Li_{1.5}Al_{0.5}Ge_{1.5}(PO_4)_3$; and $Li_3N$ and its H-substituted forms and $Li_3PO_4$ and its N-substituted forms (e.g., $Li_{2.9}PO_{3.3}N_{0.46}$ (LIPON)).

The oxide solid electrolyte may have, for example, the garnet crystal structure. Garnet-structured solid electrolytes have high lithium ion conductivity and are stable when exposed to water, oxygen, lithium metal, etc.

A garnet crystal is typically represented by the composition formula $A_3B_2C_3O_{12}$ and can take the cubic structure. An example of a garnet solid electrolyte is a composite oxide containing Li, La, and Zr. A garnet solid electrolyte can further contain at least one substituting element selected from the group of Al, Mg, Ca, Sr, Ba, Ta, Nb, and Yb.

The garnet structure, in which the A-site of $A_3B_2C_3O_{12}$ is occupied by $La^{3+}$, B-site by $Zr^{4+}$, and C-site and interstitial spaces by $Li^+$, is also referred to as the LLZ crystal structure. A crystal in the garnet structure exhibits an X-ray diffraction (XRD) pattern similar to that of CSD (Cambridge Structural Database) XRD file No. 422259 ($Li_7La_3Zr_2O_{12}$). Any garnet-like structure attributable to No. 422259 may be categorized into the garnet structure, although its diffraction angle and/or diffraction intensity ratio may be different from that of No. 422259 because of a difference in substituting element and/or Li concentration.

The molar ratio of Li to La, or Li/La, is preferably 2.0 or more and 2.5 or less, and that of Zr to La, or Zr/La, is preferably 0.5 or more and 0.67 or less. It should be noted that Zr is easily replaced with Ta, Nb, or Yb, and La, and lithium is easily replaced with Al or an alkaline earth metal. When element D is defined as at least one of Ta, Nb, and Yb, the ratio of the total number of moles of element D to the number of moles of Zr, or element D/La, may be 0.03 or more and 0.20 or less. The molar ratio of Al to La, or Al/La, may be between 0.008 and 0.12. The ratio of the total number of moles of alkaline earth metals (element E) to the number of moles of La, or element E/La, may be between 0.0016 and 0.07.

Typical examples of element-substituted forms of a garnet-structured solid electrolyte ($Li_7La_3Zr_2O_{12}$) include $Li_{7-3x}Al_xLa_3Zr_2O_{12}$ and $Li_{7-x}La_3Zr_{2-y}M_yO_{12}$ (M=Nb, Ta, or any other pentavalent element).

Examples of sulfide solid electrolytes that can be used include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$, optionally containing additives such as LiX (X: F, Cl, Br, or I), $MO_P$, and $Li_qMO_p$ (M: P, Si, Ge, B, Al, Ga, or In) (p and q: natural numbers).

Sulfide solid electrolytes are highly formable and have high lithium ion conductivity. Using a sulfide solid electrolyte as the solid electrolyte helps design a battery with a higher energy density. In particular, $Li_2S$—$P_2S_5$ exhibits higher electrochemical stability and better ionic conductivity than other sulfide solid electrolytes. Using $Li_2S$—$P_2S_5$ as the sulfide solid electrolyte helps design a battery with higher energy density and higher performance.

The inorganic solid electrolyte may be used as a molded or sintered article and may be used in the form of a sheet. The molded article may have been produced by compressing the inorganic solid electrolyte alone or by shaping a mixture of a powder of the inorganic solid electrolyte and a binder.

The molded or sintered sheet of the inorganic solid electrolyte may be coated with a layer, for example of Au, Ag, Pt, Al, Ni, Cu, In, or C, having a thickness of approximately several nanometers to tens of nanometers to provide stronger binding with the negative electrode current collector.

Second Electrolyte

The second electrolyte may be a soft material that is fluidic or plastic and has lithium ion conductivity. The second electrolyte may be a liquid (e.g., a non-aqueous electrolyte solution), a flexible solid material, or a material that has physical properties intermediate between liquid and solid. The viscosity of the liquid is not critical as long as the liquid is fluidic. The soft material may be a composite of liquid and non-liquid materials. For example, the second electrolyte may be a polymer or gel electrolyte.

An example of a polymer electrolyte is a mixture or compound of a polymer and a lithium salt. The polymer may have an alkylene oxide structure, such as the ethylene oxide structure. Polymers having the ethylene oxide structure enhance the ionic conductivity of the polymer electrolyte with their large capacity for containing the lithium salt.

An example of a gel electrolyte is a mixture of a polymer having gelling activity and a non-aqueous electrolyte solution. A gel electrolyte is a polymer retaining a non-aqueous electrolyte solution therein, has adequate plasticity and adhesiveness, and exhibits ionic conductivity comparable to that of the non-aqueous electrolyte solution. By using a gel electrolyte, therefore, high charge and discharge efficiency can be achieved. In the gel electrolyte, the mass ratio between the polymer and non-aqueous electrolyte solution may be between 2/3 and 3/2. This ensures adequate plasticity.

Examples of polymers having gelling activity include fluoropolymers containing vinylidene fluoride units, acrylic resins containing (meth)acrylic acid or (meth)acrylate units, and polyether resins containing polyalkylene oxide units. Examples of fluoropolymers containing vinylidene fluoride units include polyvinylidene fluoride, copolymers containing vinylidene fluoride and hexafluoropropylene units, and copolymers containing vinylidene fluoride and trifluoroethylene units. The polymers that can be used in polymer electrolytes (e.g., compounds having an alkylene oxide structure) may also be used.

The non-aqueous electrolyte solution contains a lithium salt and a non-aqueous solvent in which the lithium salt is dissolved. Non-aqueous electrolyte solutions help form a better reaction interface, thereby enabling higher charge and discharge efficiencies.

Examples of lithium salts that can be used include lithium hexafluorophosphate ($LiPF_6$), lithium tetrafluoroborate ($LiBF_4$), lithium perchlorate ($LiClO_4$), lithium bisfluorosulfonylimide (LiFSI, $LiN(SO_2F)_2$), lithium bistrifluoromethylsulfonylimide (LiTFSI, $LiN(SO_2CF_3)_2$), lithium bisperfluoroethylsulfonylimide ($LiN(SO_2C_2F_5)_2$), $LiAsF_6$, $LiCF_3SO_3$, and lithium difluoro(oxalato)borate. From the aspects of thermal stability and ionic conductivity, it may be that the lithium salt is $LiPF_6$. Lithium salts may be used individually or as a combination of two or more.

Examples of non-aqueous solvents that can be used include cyclic and linear carbonates, carboxylates, cyclic and linear ethers, nitriles, and amides. These non-aqueous solvents may be used individually or as a combination of two or more.

Examples of cyclic carbonates include ethylene carbonate (EC), propylene carbonate, and butylene carbonate. Their partially or completely fluorinated forms may also be used, such as trifluoropropylene carbonate and fluoroethyl carbonate. Examples of linear carbonates include dimethyl carbonate, ethyl methyl carbonate, diethyl carbonate, methyl propyl carbonate, ethyl propyl carbonate, and methyl isopropyl carbonate. Their partially or completely fluorinated forms may also be used.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ethers. Examples of linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl. Since the non-aqueous electrolyte solution comes into contact with lithium metal, it may be an ether highly resistant to reduction.

Examples of carboxylates include methyl acetate, ethyl acetate, propyl acetate, methyl propionate, ethyl propionate, and γ-butyrolactone. Examples of nitriles include acetonitrile, and examples of amides include dimethylformamide.

In the non-aqueous electrolyte solution, the molar ratio of the lithium salt to the non-aqueous solvent may be 1/4 or more. This gives the electrolyte moderate plasticity and adhesiveness, thereby enabling higher charge and discharge efficiencies.

The gel electrolyte can be disposed between the first electrolyte and negative electrode current collector by, for example, placing a mixture of a monomer or oligomer having a crosslinking functional group and a lithium salt or non-aqueous electrolyte (precursor of the gel electrolyte) between plates of the first electrolyte and negative electrode current collector and then crosslinking (polymerizing) the monomer or oligomer. This gives a one-piece structure made up of a first electrolyte, a negative electrode current collector, and a second electrolyte interposed therebetween. An alternative method is to prepare the first electrolyte, second electrolyte, and negative electrode current collector separately, stack them orderly, and apply adequate pressure in the direction of stacking.

The polymer, gel, non-aqueous liquid, or other second electrolyte may be retained in an insulating porous membrane. Retaining the second electrolyte in an insulating porous membrane helps form a thinner and more uniform reaction interface.

Insulating Porous Membrane

The insulating porous membrane may be a fiber aggregate or microporous film. A fiber aggregate is a material composed primarily of fibers like non-woven or woven fabric. Besides fibers, a fiber aggregate may contain a powder, a binder, and/or other additives. A microporous membrane is a film having micropores, which can be created by, for example, stretching the film or removing a pore-forming material premixed into the film.

Positive Electrode

The positive electrode includes, for example, a positive electrode mixture layer and a positive electrode current collector. The positive electrode mixture layer contains a positive electrode active material capable of storing and releasing lithium ions and may optionally contain a conductive additive, an ion conductor, a binder, and/or other additives. Conductive additives and ion conductors, if used, are intended to reduce the electrical resistance of the electrode.

Examples of conductive additives include carbon materials, such as graphite and carbon black (e.g., acetylene black); and conductive polymers, such as polyaniline, polypyrrole, and polythiophene.

Examples of ion conductors include gel electrolytes, such as polymethyl methacrylate; organic solid electrolytes, such as polyethylene oxide; and inorganic solid electrolytes, such as $Li_{1.5}Al_{0.5}Ge_{1.5}(PO_4)_3$.

Binders, if used, are intended to improve the binding of the electrode components with one another. Specific examples include fluoropolymers, such as polyvinylidene fluoride, copolymers containing vinylidene fluoride and hexafluoropropylene units, copolymers containing vinylidene fluoride and tetrafluoroethylene units, and polytetrafluoroethylene; carboxymethyl cellulose; polyacrylic acid; styrene-butadiene copolymer rubbers; polypropylene; polyethylene; and polyimides.

The positive electrode active material can be a material that stores and releases lithium ions. Examples of positive electrode active materials include lithium-metal-containing transition metal oxides, transition metal fluorides, polyanionic materials, fluorinated polyanionic materials, and transition metal sulfides. The positive electrode active material may be a lithium-metal-containing transition metal oxide, inexpensive to produce and offering a high average discharge voltage.

The positive electrode current collector can be, for example, a porous or nonporous sheet or film of aluminum, stainless steel, titanium, an alloy thereof, or any other metallic material. Aluminum and its alloys are inexpensive and easy to work into a thin film. The sheet or film can be, for example, metal foil or mesh. The positive electrode current collector may be coated with carbon or any other carbon material to reduce its electrical resistance, give it catalytic activity, and reinforce the chemical or physical binding between the positive electrode mixture layer and positive electrode current collector.

It should be understood that the lithium metal secondary batteries are not limited in shape and can be configured so as to be applicable to a wide range of batteries, including coin-shaped, cylindrical, square, sheet-shaped, button-shaped, flat, and stacked batteries.

The following describes the present disclosure in further detail on the basis of examples, although the present disclosure is not limited to these examples.

Example A1

Negative Electrode

Figure 3:
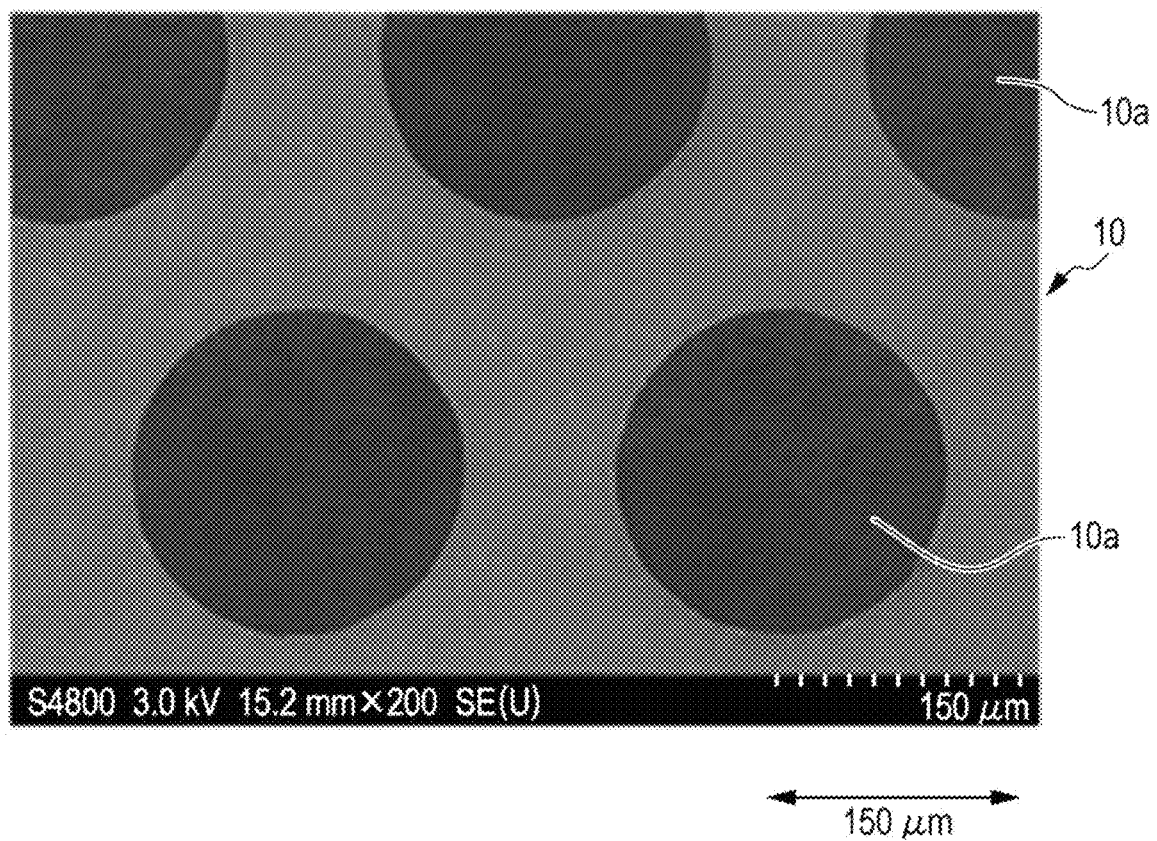
FIG. 3 is an SEM image of the first surface of the negative electrode current collector according to Example A1.

As the negative electrode current collector, a two-dimensionally porous metal sheet was prepared that had multiple round through holes as illustrated in FIG. 3. The negative electrode current collector was made of copper and 40 μm thick. To obtain such a negative electrode current collector, a copper sheet was perforated by chemical etching to create through holes having an average diameter of 100 μm. The resulting current collector was punched to give a disk having a diameter of 10 mm, which served as the negative electrode current collector. The percentage of the total volume of the multiple through holes to the apparent volume of the negative electrode current collector, including that of the through holes, was 35%.

Positive Electrode

Lithium metal foil having a thickness of 300 μm (Honjo Chemical Corporation) was punched to give a disk having a diameter of 12 mm, which served as the positive electrode.

First Electrolyte

A pellet of $Li_{1.5}Al_{0.5}Ge_{1.5}(PO_4)_3$ having a diameter of 12 mm (Toshima Manufacturing Co., Ltd.) served as the first electrolyte (solid electrolyte). The pellet was coated on both surfaces with Au by sputtering it onto a region with a diameter of 10 mm at 5 mA for 5 minutes using a sputter coater.

Second Electrolyte

A gel electrolyte was prepared as follows.

Polyethylene oxide, for use as a matrix polymer having gelling activity, and a 1:10 (molar ratio) mixture of LiTFSI and EC, prepared as a non-aqueous electrolyte solution, were mixed in a non-aqueous electrolyte solution to polymer ratio of 1:1 (mass ratio), and the resulting mixture was stirred for 2 hours using a stirrer. The stirred mixture was stirred with 8000 ppm of the curing agent peroxycarbonate (Perkadox 16, Kayaku Akzo Corporation) for 2 hours to give the precursor of the gel electrolyte. The thickness of the gel electrolyte precursor was 500 μm.

Test Cell

A half cell having a lithium metal positive electrode was fabricated as the test cell. To obtain such a cell, the pellet of the solid electrolyte was coated with the gel electrolyte precursor on the surface facing the negative electrode current collector. The positive electrode, solid electrolyte pellet, and negative electrode current collector were stacked in this order, and the resulting stack was compressed, in the direction of stacking, with a pressure of 0.5 kgf/cm² using a pressing jig to yield a lithium metal secondary battery.

In a thermostat bath preheated to and held at 80° C., the resulting lithium metal secondary battery was maintained for 20 minute to polymerize the gel electrolyte precursor and thereby to join the solid electrolyte and negative electrode current collector together via the gel electrolyte, completing the test cell of Example A1. The thickness of the gel electrolyte precursor interposed between the solid electrolyte and negative electrode current collector was 500 μm. A cross-section of the negative electrode was then observed using an SEM, and the percentage of the volume of second electrolyte contained in the multiple through holes to the total volume of the through holes was 50%.

Example A2

The test cell of Example A2 was fabricated in the same way as in Example A1, except that the pressure for compressing the stack in the direction of stacking using a pressing jig was 1 kgf/cm². The percentage of the volume of second electrolyte contained in the multiple through holes to the total volume of the through holes was 70%.

Example A3

The test cell of Example A3 was fabricated in the same way as in Example A1, except that the pressure for compressing the stack in the direction of stacking using a pressing jig was 5 kgf/cm². The percentage of the volume of second electrolyte contained in the multiple through holes to the total volume of the through holes was 80%.

Example A4

The test cell of Example A4 was fabricated in the same way as in Example A1, except that the non-aqueous electrolyte solution was a 1:1 (molar ratio) mixture of LiTFSI and EC. The percentage of the volume of second electrolyte contained in the multiple through holes to the total volume of the through holes was 30%.

Example A5

The test cell of Example A5 was fabricated in the same way as in Example A1, except that the non-aqueous electrolyte solution was a 1:4 (molar ratio) mixture of LiTFSI and EC, that this non-aqueous electrolyte solution was retained in an insulating porous membrane (made of polyolefin), and that the positive electrode, solid electrolyte pellet, insulating porous membrane, and negative electrode current collector were stacked in this order. The percentage of the volume of second electrolyte contained in the multiple through holes to the total volume of the through holes was 45%.

Example A6

The test cell of Example A6 was fabricated in the same way as in Example A1, except that the stack was not compressed. The percentage of the volume of second electrolyte contained in the multiple through holes to the total volume of the through holes was 5%.

Comparative Example C1

The test cell of Comparative Example C1 was fabricated in the same way as in Example A1, except that no gel electrolyte was used.

Charge and Discharge Test

The test cells of Examples A1 to A6 and Comparative Example C1 were subjected to the following charge and discharge test in a thermostat bath at 60° C. On the basis of the results, the charge and discharge properties of the test cells were evaluated.

In the charge and discharge test, the test electrodes, including the negative electrode, were charged and then, after a pause of 20 minutes, discharged. The cutoff voltages were set to −3 V for charging and 2 V for discharging. The discharge capacity (charge and discharge property) was evaluated as follows.

The test electrodes were charged at a constant current per electrode area of 0.025 mA/cm² for 10 hours, and then discharged at a constant current per electrode area of 0.025 mA/cm² until the difference in potential from that of the reference electrode reached 1 V. A pause of 20 minutes then followed. With this series of charge and discharge processes defined as one cycle, a charge and discharge test was performed. The charge and discharge efficiency was determined by dividing the discharge capacity by the charge capacity.

Table 1 summarizes the determined charge and discharge efficiency for each of Examples A1 to A6 and Comparative Example C1. In Table 1, "Vel/Vholes" represents the percentage of the total volume of second electrolyte contained in the multiple holes to that of the holes.

TABLE 1

| Test cell | Vel/Vholes (%) | Charge and discharge efficiency (%) |
| --- | --- | --- |
| A1 | 50 | 15 |
| A2 | 70 | 18 |
| A3 | 80 | 18 |
| A4 | 30 | 14 |
| A5 | 45 | 13 |
| A6 | 5 | 12 |
| C1 | 0 | 2 |

Figure 4:
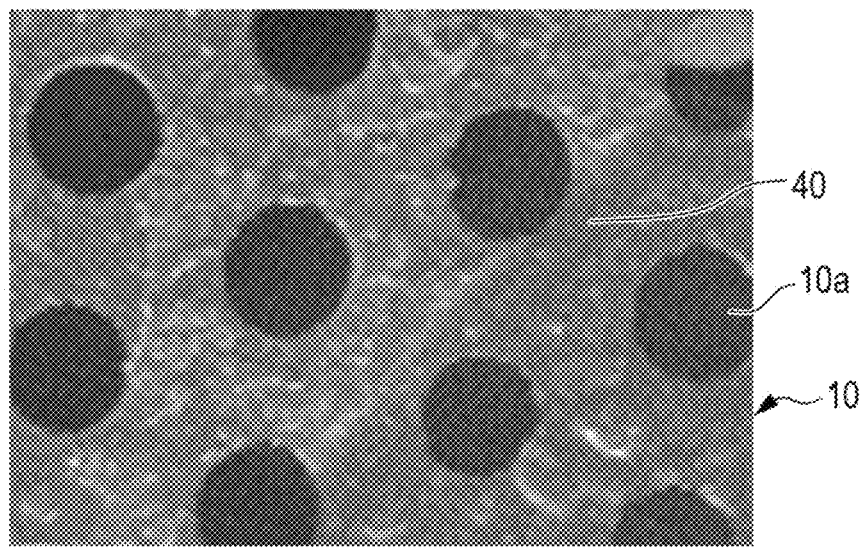
FIG. 4 is an SEM image of the first surface of the negative electrode current collector of the test cell of Example A1, the image taken before compressing the test cell and with the negative electrode current collector in contact with the second electrolyte.
Figure 5:
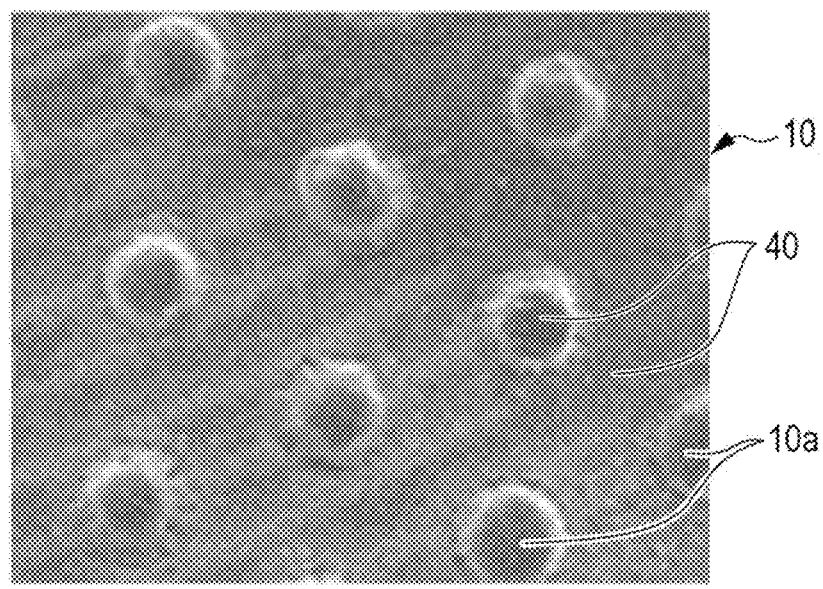
FIG. 5 is an SEM image of the first surface of the negative electrode current collector of the test cell of Example A1, the image taken after compressing the test cell with a pressure of 1 kgf/cm$^2$ and with the negative electrode current collector in contact with the second electrolyte.

FIG. 4 is a scanning electron microscope (SEM) observation of through holes 10a in the negative electrode current collector 10 of the test cell of Example A1 before compression. FIG. 5 is an SEM observation of through holes 10a in the negative electrode current collector 10 of the test cell of Example A1 made compression. As can be seen from FIG. 5, the second electrolyte (gel electrolyte) 40 was pushed into the through holes 10a as a result of compression.

Figure 6:
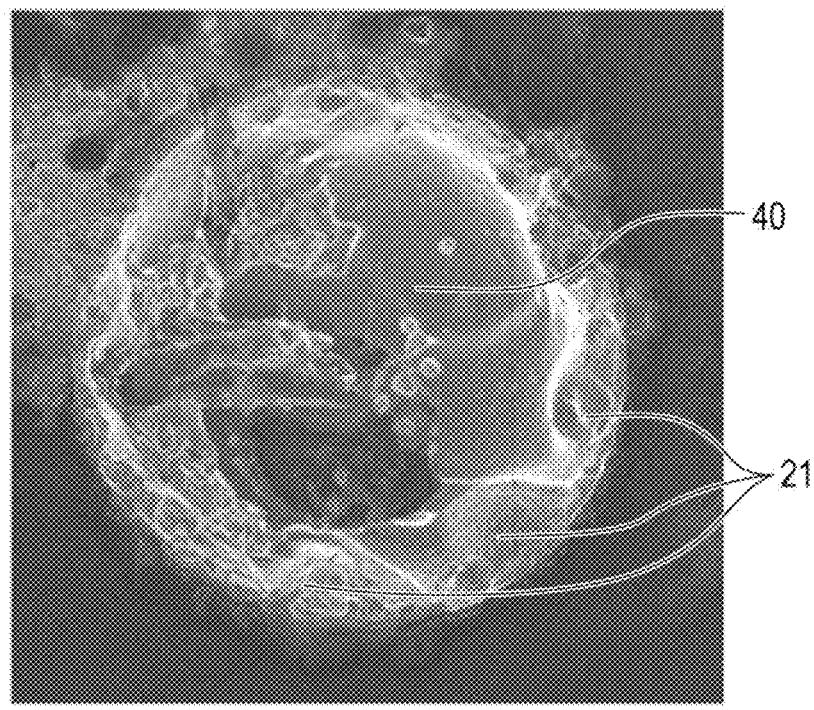
FIG. 6 is an SEM image of the first surface of the negative electrode current collector of the test cell of Example A1, the image taken upon charging.
Figure 7:
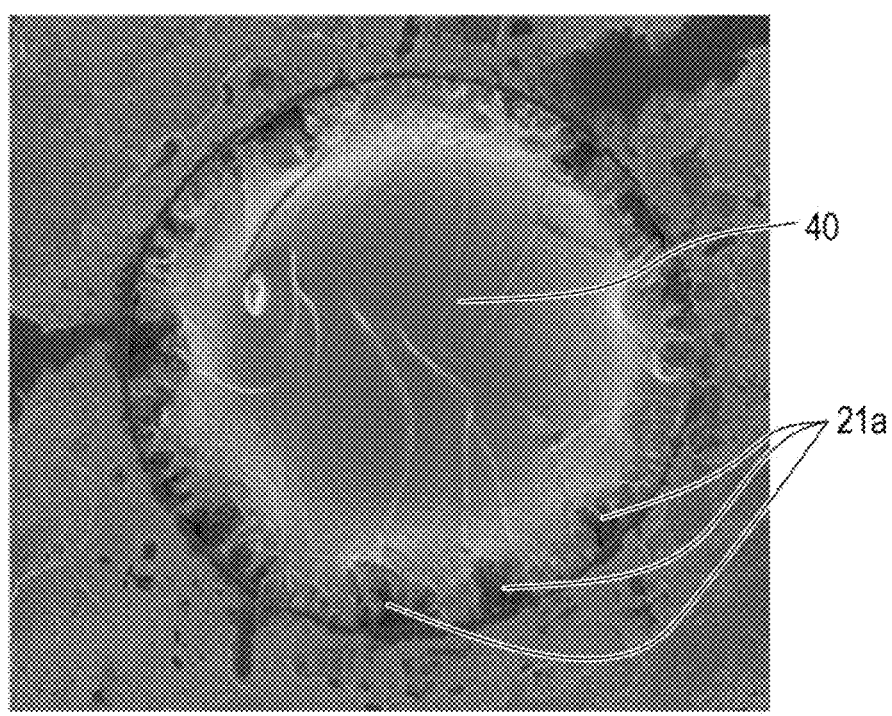
FIG. 7 is an SEM image of the first surface of the negative electrode current collector of the test cell of Example A1, the image taken upon discharging.

FIG. 6 is an SEM observation of the first surface of the negative electrode current collector of the test cell of Example A1 upon charging. FIG. 7 is an SEM observation of the first surface of the negative electrode current collector of the test cell of Example A1 upon discharging. In FIG. 6, representing the charged cell, deposited masses of lithium metal 21 are seen at the interface between the inner wall of a through hole 10a in the negative electrode current collector 10 and the second electrolyte (gel electrolyte) 40, indicating that lithium metal 21 was deposited preferentially in the through holes in the negative electrode current collector. In FIG. 7, representing the discharged cell, little lithium metal has been deposited. Around the gel electrolyte 40, clearances 21a were left as a sign of the dissolution of lithium metal.

In Comparative Example C1, since no gel electrolyte was present, little lithium was deposited in the through holes. As a result, the charge and discharge efficiency, calculated by dividing the discharge capacity by the charge capacity, was significantly low. This extremely low charge and discharge efficiency of 2% in gel-electrolyte-free Comparative Example C1 indicates that the discharging process was stagnant.

By contrast, in the cases in which the gel electrolyte was put into the through holes, the charge and discharge efficiency was improved to 12% to 18%. Moreover, adjusting the composition of the non-aqueous electrolyte solution and other parameters also effectively improved the charge and discharge efficiency. The variability in charge and discharge efficiency observed in the cases in which the gel electrolyte was put into the through holes is attributable to the difference in the percentage of the volume in the through holes filled with the gel electrolyte.

Example B1

The test cell of Example B1 was fabricated in the same way as in Example A1, except that $Li_7La_3Zr_{1.5}O_2$ was used as the first electrolyte (solid electrolyte). The percentage of the volume of second electrolyte contained in the multiple through holes to the total volume of the through holes was 30%.

Example B2

The test cell of Example B2 was fabricated in the same way as in Example B1, except that the pressure for compressing the stack in the direction of stacking using a pressing jig was 1 kgf/cm². The percentage of the volume of second electrolyte contained in the multiple through holes to the total volume of the through holes was 45%.

Example B3

The test cell of Example B3 was fabricated in the same way as in Example B1, except that the pressure for compressing the stack in the direction of stacking using a pressing jig was 5 kgf/cm². The percentage of the volume of second electrolyte contained in the multiple through holes to the total volume of the through holes was 70%.

Example B4

The test cell of Example B4 was fabricated in the same way as in Example B1, except that the thickness of the gel electrolyte precursor interposed between the solid electrolyte and negative electrode current collector was set to 50 µm. The percentage of the volume of second electrolyte contained in the multiple through holes to the total volume of the through holes was 15%.

Example B5

The test cell of Example B5 was fabricated in the same way as in Example B4, except that the non-aqueous electrolyte solution was a 1:2 (molar ratio) mixture of LiFSI and tetraethylene glycol dimethyl ether (TEGDME). The percentage of the volume of second electrolyte contained in the multiple through holes to the total volume of the through holes was 15%.

Example B6

The test cell of Example B6 was fabricated in the same way as in Example B1, except that the non-aqueous electrolyte solution was a 1:1 (molar ratio) mixture of LiTFSI and EC, that the solid electrolyte pellet was coated with 0.04 mL/cm² of non-aqueous electrolyte solution alone, without the matrix polymer, and that the stack was made in such a manner that the applied non-aqueous electrolyte solution faced the negative electrode current collector. The percentage of the volume of second electrolyte contained in the multiple through holes to the total volume of the through holes was 45%.

Example B7

The test cell of Example B7 was fabricated in the same way as in Example B1, except that the non-aqueous electrolyte solution was a 1:4 (molar ratio) mixture of LiTFSI and EC, that this non-aqueous electrolyte solution was retained in into an insulating porous membrane (made of polyolefin, 20-µm thick), and that the positive electrode, solid electrolyte pellet, insulating porous membrane, and negative electrode current collector were stacked in this order. The percentage of the volume of second electrolyte contained in the multiple through holes to the total volume of the through holes was 40%.

Example B8

The test cell of Example B8 was fabricated in the same way as in Example B1, except that the stack was not compressed. The percentage of the volume of second electrolyte contained in the multiple through holes to the total volume of the through holes was 3%.

Example B9

The test cell of Example B9 was fabricated in the same way as in Example B1, except that an 80-µm-thick copper sheet having multiple bottomed holes 40 µm deep created therein served as the negative electrode current collector. The percentage of the volume of second electrolyte contained in the multiple through holes to the total volume of the through holes was 30%.

Comparative Example C2

The test cell of Comparative Example C2 was fabricated in the same way as in Example B1, except that no gel electrolyte was used.

Comparative Example C3

The test cell of Comparative Example C3 was fabricated in the same way as in Example B1, except that no solid electrolyte was used.

Charge and Discharge Test

The charge and discharge properties of each of the test cells of Examples B1 to B9 and Comparative Examples C2 and C3 were evaluated in the way described above.

Table 2 summarizes the determined charge and discharge efficiency for each of Examples B1 to B9 and Comparative Examples C2 and C3.

TABLE 2

| Test cell | Vel/Vholes (%) | Charge and discharge efficiency (%) |
| --- | --- | --- |
| B1 | 30 | 30 |
| B2 | 45 | 41 |
| B3 | 70 | 43 |
| B4 | 15 | 68 |
| B5 | 15 | 83 |
| B6 | 45 | 36 |
| B7 | 40 | 33 |
| B8 | 3 | 28 |
| B9 | 30 | 31 |
| C2 | 0 | 4 |
| C3 | 30 | 7 |

Figure 8:
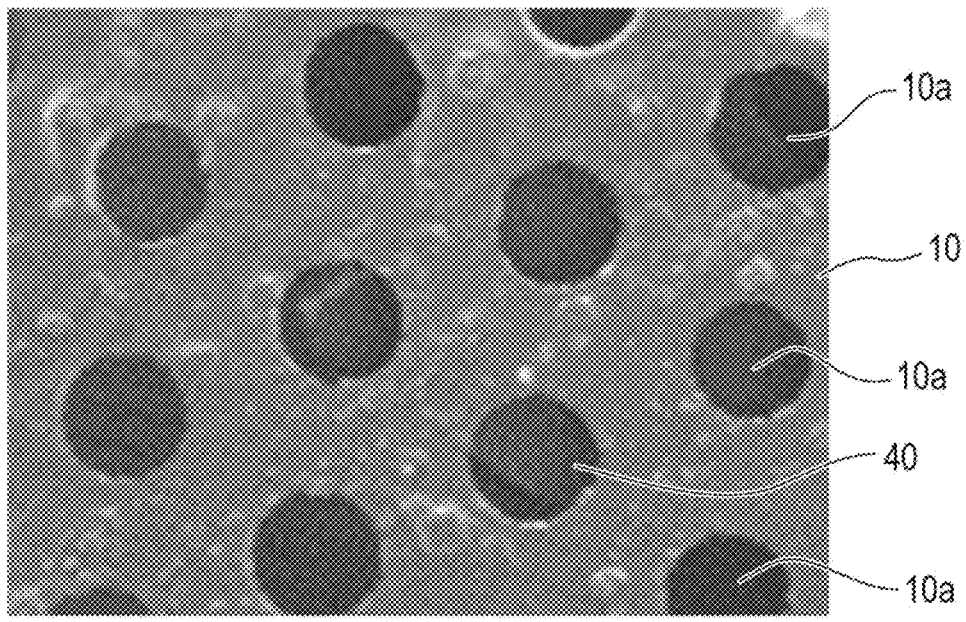
FIG. 8 is an SEM image of the first surface of the negative electrode current collector of the test cell of Example B1, the image taken before compressing the test cell and with the negative electrode current collector in contact with the second electrolyte.
Figure 9:
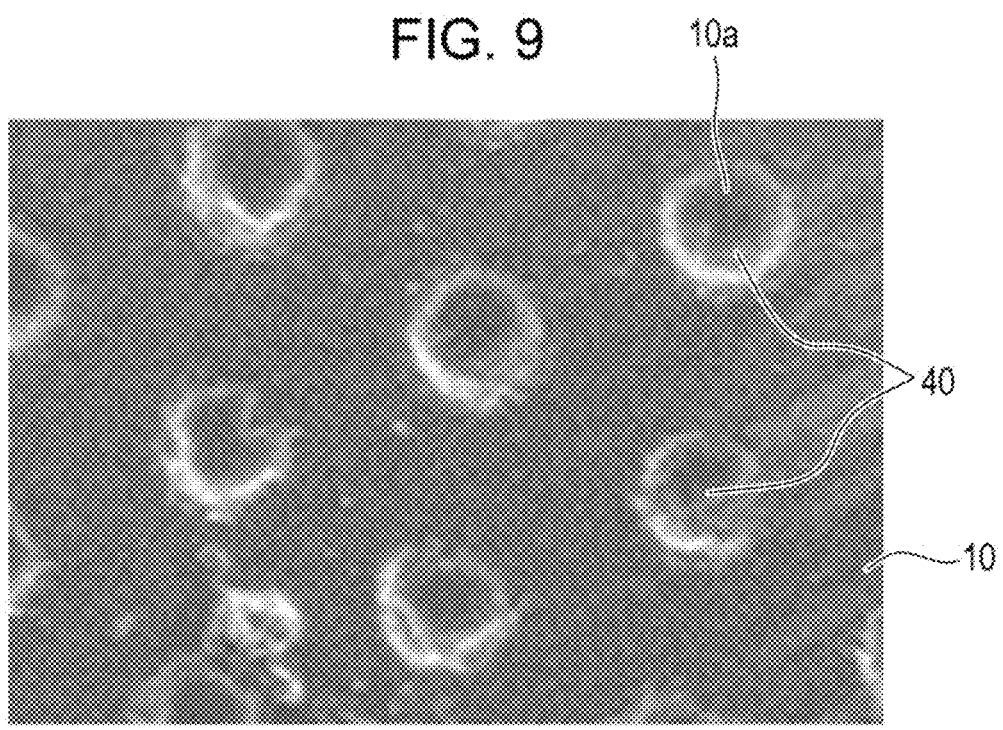
FIG. 9 is an SEM image of the first surface of the negative electrode current collector of the test cell of Example B1, the image taken after compressing the test cell with a pressure of 1 kgf/cm$^2$ and with the negative electrode current collector in contact with the second electrolyte.
Figure 10:
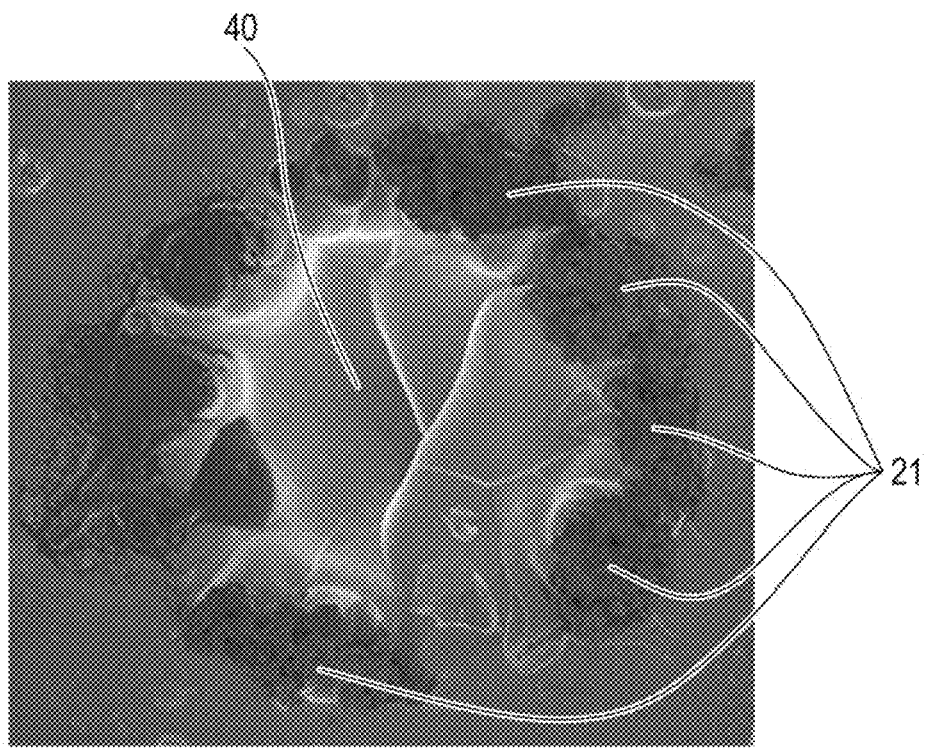
FIG. 10 is an SEM image of the first surface of the negative electrode current collector of the test cell of Example B1, the image taken upon charging.
Figure 11:
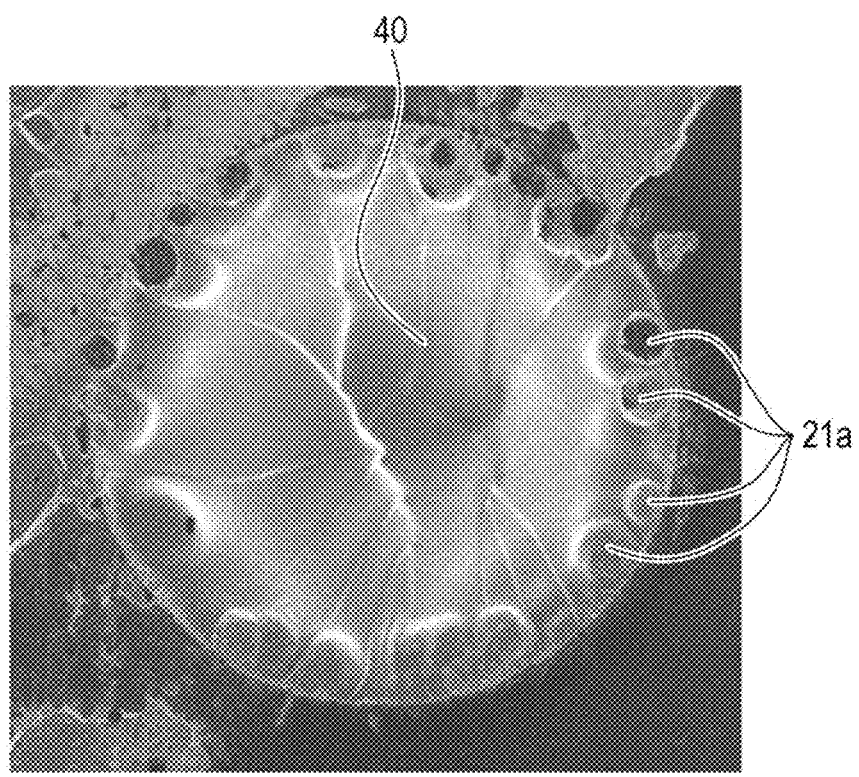
FIG. 11 is an SEM image of the first surface of the negative electrode current collector of the test cell of Example B1, the image taken upon discharging.

FIG. 8 is an SEM observation of through holes 10a in the negative electrode current collector 10 of the test cell of Example B1 before compression. FIG. 9 is an SEM observation of through holes 10a in the negative electrode current collector 10 of the test cell of Example B1 made compression. FIG. 10 is an SEM image of the first surface of the negative electrode current collector of the test cell of Example B1 after charging. FIG. 11 is an SEM image of the first surface of the negative electrode current collector of the test cell of Example B1 after discharging. The results derived from FIGS. 8 to 11 are consistent with those in FIGS. 4 to 7.

When Examples B1 and B9 are compared, it turns out that the advantage of improved charge and discharge efficiency occurs regardless of the shape of the holes.

When Example B1 is compared with Comparative Examples C2 and C3, it turns out that the advantage of improved charge and discharge efficiency owes not only to the structure of the negative electrode current collector but also to the combination use of gel and solid electrolytes. If no gel electrolyte is present (Comparative Example C2), little lithium is deposited in the holes. If no solid electrolyte is present (Comparative Example C3), the gel electrolyte is in direct contact with Li metal foil and, therefore, is reductively decomposed during charging and discharging. Both result in low charge and discharge efficiency.

In Examples B1 to B9, in which $Li_7La_3Zr_{1.5}O_2$ served as the first electrolyte (solid electrolyte), the charge and discharge efficiency was higher than in Examples A1 to A6, in which $Li_{1.5}Al_{0.5}Ge_{1.5}(PO_4)_3$ was used.

Variation

Figure 12A:
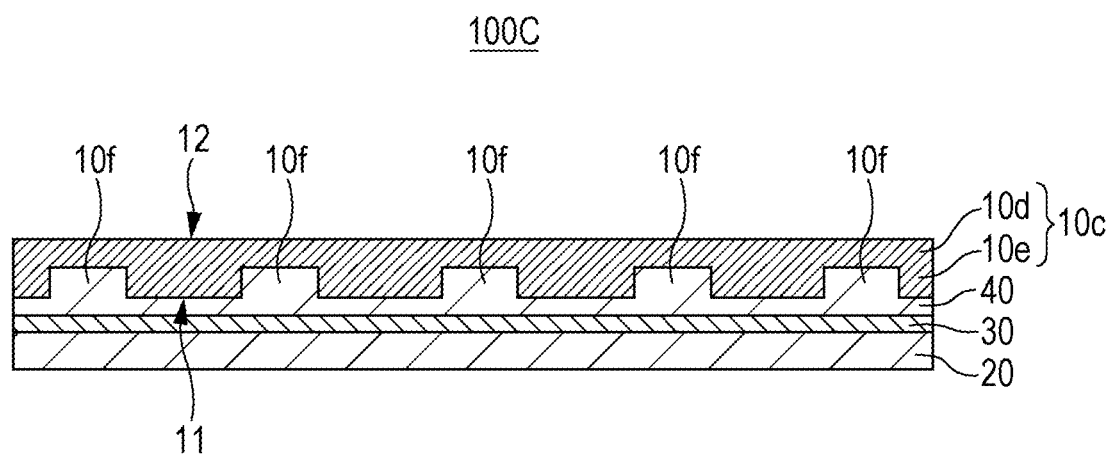
FIG. 12A is a schematic diagram illustrating the cross-sectional structure of a lithium metal secondary battery according to a variation.
Figure 12B:
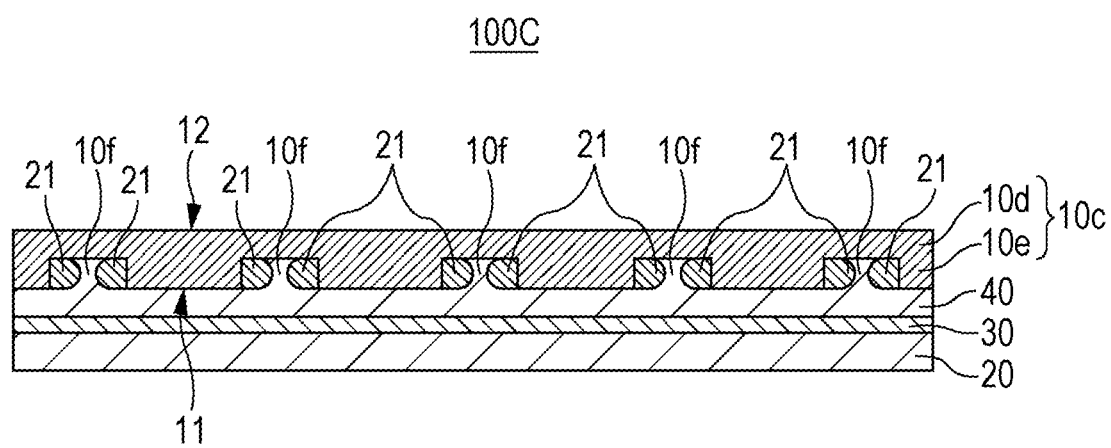
FIG. 12B is a schematic diagram illustrating the cross-sectional structure of the lithium metal secondary battery according to a variation.

FIGS. 12A and 12B illustrate the cross-sectional structure of a lithium metal secondary battery 100C according to a variation. FIG. 12A schematically illustrates the lithium metal secondary battery 100C in the discharged state right after assembly, and FIG. 12B the lithium metal secondary battery 100C in the charged state. The lithium metal secondary battery 100C is equivalent to the lithium metal secondary battery 100A except for the structure of the negative electrode current collector 10c.

The negative electrode current collector 10c of the lithium metal secondary battery 100C includes a base portion 10d and multiple protrusions 10e. The base portion 10d is in the shape of a sheet or plate. The protrusions 10e are on the first surface 11 side of the negative electrode current collector 10c.

The base portion 10d and protrusions 10e may be united or separate. If the base portion 10d and protrusions 10e are united, the protrusions 10e represent portions of the base portion 10d sticking out of a reference plane. The reference plane is, for example, a plane parallel to the second surface 12 of the negative electrode current collector 10c and including part of the first surface 11 of the negative electrode current collector 10c. If the base portion 10d and protrusions 10e are separate, the protrusions 10e are on the surface of the base portion 10d.

Examples of patterns in which the protrusions 10e may be arranged include, but are not limited to, dots, stripes, and grids.

The negative electrode current collector 10c has vacant spaces 10f, not occupied by the protrusions, on the first surface 11 side. In other words, the vacant spaces 10f lie between the protrusions 10e. The vacant spaces 10f of the negative electrode current collector 10c are capable of containing the second electrolyte 40.

During charging, lithium ions released from the positive electrode 20 move preferentially into the second electrolyte 40 contained in the vacant spaces 10f, and are deposited inside these vacant spaces 10f, forming lithium metal 21. Since the lithium metal 21, as illustrated in FIG. 12B, is deposited on the side walls of the protrusions 10e, the expansion of the lithium metal secondary battery 100C in the direction of thickness is limited. Subsequently discharging the lithium metal secondary battery 100C can create clearances in portions of the regions in which the lithium metal 21 deposited during charging is present.

Like the lithium metal secondary battery 100A and its examples, the lithium metal secondary battery 100C according to this variation would also provide the advantage of improved charge and discharge efficiency.

What is claimed is:

1. A lithium metal secondary battery comprising:
   a first positive electrode;
   a negative electrode including a negative electrode current collector having a plurality of holes, in each of which lithium metal is deposited in a charged state;
   a first solid electrolyte disposed on a surface, which faces the negative electrode current collector, of the first positive electrode, the first solid electrolyte having lithium ion conductivity; and
   a soft electrolyte filling a space between the negative electrode current collector and the first solid electrolyte and entering into the plurality of holes, the soft electrolyte being a polymer electrolyte or a gel electrolyte having lithium ion conductivity, wherein
   the deposited lithium metal is in direct contact with the polymer electrolyte or the gel electrolyte in each of the plurality of holes.

2. The lithium metal secondary battery according to claim 1, wherein
   the plurality of holes are a plurality of through holes passing through the negative electrode current collector.

3. The lithium metal secondary battery according to claim 1, wherein
   the plurality of holes are a plurality of bottomed holes provided on a surface, which faces the first positive electrode, of the negative electrode current collector.

4. The lithium metal secondary battery according to claim 1, wherein
   a soft electrolyte fills each of the plurality of holes with a clearance, in which the lithium metal is deposited in a charged state, and
   the clearance is left in a discharged state as a space not filled with the soft electrolyte.

5. The lithium metal secondary battery according to claim 1, wherein
   the first solid electrolyte is an inorganic solid electrolyte.

6. The lithium metal secondary battery according to claim 5, wherein
   the inorganic solid electrolyte is a molded electrolyte or a sintered electrolyte.

7. The lithium metal secondary battery according to claim 5, wherein
   the inorganic solid electrolyte has a garnet structure.

8. The lithium metal secondary battery according to claim 7, wherein
   the inorganic solid electrolyte is a composite oxide containing Li, La, and Zr.

9. The lithium metal secondary battery according to claim 8, wherein
   the composite oxide further contains at least one selected from the group consisting of Al, Mg, Ca, Sr, Ba, Ta, Nb, and Yb.

10. The lithium metal secondary battery according to claim 1, wherein
    a percentage of a total volume of the soft electrolyte filling the plurality of holes to a total volume of the plurality of holes is 3% or more and 90% or less.

11. The lithium metal secondary battery according to claim 10, wherein
    the percentage is 80% or less.

12. The lithium metal secondary battery according to claim 1, further comprising:
    a second positive electrode disposed opposite to the first positive electrode across the soft electrolyte and the negative electrode; and
    a second solid electrolyte on a surface, which faces the negative electrode current collector, of the second positive electrode, the second solid electrolyte having lithium ion conductivity, wherein
    the soft electrolyte further fills a space between the negative electrode current collector and the second solid electrolyte.

13. The lithium metal secondary battery according to claim 1, wherein
 a thickness of the negative electrode current collector is 6 µm or more and 150 µm or less.

14. The lithium metal secondary battery according to claim 1, wherein
 an average diameter of the plurality of holes is 5 µm or more.

15. The lithium metal secondary battery according to claim 1, wherein
 the negative electrode current collector is an only component of the negative electrode.

16. A lithium metal secondary battery comprising:
 a positive electrode;
 a negative electrode including a negative electrode current collector having a plurality of protrusions, around each of which lithium metal is deposited in a charged state;
 a solid electrolyte disposed on a surface, which faces the negative electrode current collector, of the positive electrode, the solid electrolyte having lithium ion conductivity; and
 a soft electrolyte filling a space between the negative electrode current collector and the solid electrolyte and around the plurality of protrusions, the soft electrolyte being a polymer electrolyte or a gel electrolyte having lithium ion conductivity, wherein
 the deposited lithium metal is in direct contact with the polymer electrolyte or the gel electrolyte around a side wall of each of the plurality of protrusions.

\* \* \* \* \*